United States Patent
Sullivan et al.

(10) Patent No.: US 9,028,732 B2
(45) Date of Patent: *May 12, 2015

(54) SELF-ADHERED SINGLE-SIDED SLIP-RESISTANT MATERIAL

(71) Applicant: Multi Technologies Industrial L.L.C., Brentwood, NH (US)

(72) Inventors: Michael C. Sullivan, Cape Elizabeth, ME (US); Thomas Zickell, II, Winter Park, FL (US); George M. Orlych, Barrington, NH (US)

(73) Assignee: Multi Technologies Industrial L.L.C., Brentwood, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/054,095

(22) Filed: Oct. 15, 2013

(65) Prior Publication Data

US 2014/0138867 A1    May 22, 2014

Related U.S. Application Data

(63) Continuation of application No. 13/209,631, filed on Aug. 15, 2011, now Pat. No. 8,632,706.

(60) Provisional application No. 61/373,957, filed on Aug. 16, 2010.

(51) Int. Cl.
| | |
|---|---|
| *B29C 44/24* | (2006.01) |
| *B29C 47/06* | (2006.01) |
| *B29C 47/00* | (2006.01) |
| *B29C 53/10* | (2006.01) |
| *B29C 44/56* | (2006.01) |
| *B29C 47/88* | (2006.01) |
| *B29L 7/00* | (2006.01) |

(52) U.S. Cl.
CPC .......... *B29C 47/0042* (2013.01); *B29C 47/068* (2013.01); *B29C 47/0054* (2013.01); *B29C 53/10* (2013.01); *B29C 44/24* (2013.01); *B29C 44/5627* (2013.01); *B29C 44/5672* (2013.01); *B29C 47/0026* (2013.01); *B29C 47/0057* (2013.01); *B29C 47/0066* (2013.01); *B29C 47/065* (2013.01); *B29C 47/8805* (2013.01); *B29C 47/8845* (2013.01)

(58) Field of Classification Search
USPC ................... 264/46.1, 46.3, 173.15, 514, 564
See application file for complete search history.

(56) References Cited

U.S. PATENT DOCUMENTS

| | | | | |
|---|---|---|---|---|
| 2,955,318 | A * | 10/1960 | Cook et al. .................... | 264/280 |
| 4,045,270 | A * | 8/1977 | Jofs .............................. | 156/229 |
| 4,148,955 | A * | 4/1979 | Breitenfellner et al. ...... | 428/143 |
| 5,324,572 | A * | 6/1994 | Kuechler et al. ............. | 428/215 |

(Continued)

FOREIGN PATENT DOCUMENTS

WO    WO 02083395 A1 * 10/2002

*Primary Examiner* — Atul P. Khare

(74) *Attorney, Agent, or Firm* — Bourque and Associates, PA

(57) ABSTRACT

A single-sided, slip resistant, self-adhesive material is produced using a blown film process which produces a film having an interior layer capable of being treated or coated to accept a pressure sensitive adhesive, a middle layer of flexible polyolefin and an exterior polyolefin elastomer layer in combination with a blowing agent to produce a single-sided slip resistant material. A number of in-line rollers are optionally provided after a pair of nip rollers, which form part of a machine direction orienter (MDO) that is used in line in the manufacturing process to heat, and then cool and condition (anneal and relieve any stresses and/or thickness inconsistencies) the film prior to the film being coated on one side with a pressure sensitive adhesive.

13 Claims, 1 Drawing Sheet

(56) References Cited

U.S. PATENT DOCUMENTS

| | | | | |
|---|---|---|---|---|
| 5,468,444 A | * | 11/1995 | Yazaki et al. | 264/566 |
| 6,013,222 A | * | 1/2000 | Douglas et al. | 264/514 |
| 6,368,545 B1 | * | 4/2002 | Bailey et al. | 264/514 |
| 6,699,549 B1 | * | 3/2004 | Ueyama et al. | 428/36.7 |
| 6,986,921 B2 | * | 1/2006 | Schmal et al. | 428/35.2 |
| 2005/0136219 A1 | * | 6/2005 | Guenter et al. | 428/141 |

* cited by examiner

SELF-ADHERED SINGLE-SIDED SLIP-RESISTANT MATERIAL

CROSS-REFERENCE TO RELATED APPLICATIONS

This application is a Continuation of U.S. patent application Ser. No. 13/209,631 filed on Aug. 15, 2011 titled "Self-Adhered Single-Sided Slip-Resistant Material" which in turn claims priority from U.S. Provisional Patent Application No. 61/373,957 titled "Self-Adhered Single-Sided Slip-Resistant Material" filed on Aug. 16, 2010 and both of which are incorporated fully herein by reference.

TECHNICAL FIELD

The present invention relates to slip resistant material and more particularly, relates to a transparent, self-adhered protective covering having a non-slip or slip-resistant upper surface.

BACKGROUND INFORMATION

There is often a need for a transparent, all purpose, lightweight, protective, self-adhered material to cover marine craft surfaces, such as boat decks and hulls during moving and storage, construction or other activities such as repair, renovation, painting and decorating or when exhibiting the boat to the public. Many other uses for such a film also exist. One problem that has consistently been struggled with for such material is the need of the material to be transparent, self adhesive, and have a top surface that is slip resistant.

During boat maintenance, for example, there have been some prior art attempts at using kraft paper and masking tape to mask off surfaces prior to renovation. Paper does not have UV resistance, is not terribly resistant to tearing, nor is it impervious to moisture, all of which are significant factors encountered in the marine industry.

Accordingly, what is needed is a lightweight, self adhered, UV resistant, transparent film like material that is generally impervious to water and other liquids and resists tearing while providing a non-slip or slip-resistant surface.

SUMMARY OF THE INVENTION

The present invention features a method of making a single-sided, anti-slip film comprising the acts of using a film blowing machine to co-extrude a multi-layer film through a circular die to form a tube, wherein the tube includes at least three co-extruded layers of film including an inner layer, an outer layer and a middle layer. The outer layer comprises a blowing agent that expands to form a slip resistant outer layer. The tube has a first side and a second side, each side including said at least three co-extruded layers.

The method next includes drawing the co-extruded multi-layer film tube vertically upwardly away from the circular die at a predetermined speed. At a predetermined distance from the circular die, the method next involves collapsing the co-extruded multi-layer film tube by passing the film tube through at least two parallel rollers placed in close proximity to one another such that the first roller contacts the first side of the coextruded multilayer film tube, while the second roller contacts the second side of the coextruded multilayer film tube. The resultant collapsed, co-extruded, multi-layer film has first and second edges.

In one embodiment utilizing an in-line Machine Direction Orienter (MDO) the method of the invention involves subsequently passing the collapsed, co-extruded, multi-layer film through a first pair of in-line rollers, wherein at least one of the first pair of rollers is heated to a temperature above a glass transition temperature and below a softening point of the inner layer of said film. The first pair of in-line rollers rotate at a speed that is approximately the same speed as the predetermined speed at which the co-extruded multi-layer film tube is drawn from the circular die.

The method including the embodiment utilizing the MDO next involves passing the film through a second pair of in-line rollers. At least one of the second pair of in-line rollers includes at least one roller which is operated at a temperature which is cooler than the softening point of the inner layer of the film. The second pair of in-line rollers rotate at a speed that is faster than the speed of the first pair of in-line rollers, thereby causing the film to be stretched in at least one direction.

In all embodiments, the method next involves cutting the collapsed, co-extruded, multi-layer film proximate the first and second edges to form two generally identical film layers each with an inner surface and an outer surface, each film layer having an outer surface that is non-slip.

In one embodiment, the method further includes after the act of cutting the collapsed, co-extruded, multi-layer film proximate the first and second edges to form two generally identical film layers, the act of applying a pressure sensitive adhesive to the inner surface of each of the two generally identical film layers. The adhesive may be acrylic based.

In a further embodiment, the outer layer may include a plurality of gas bubbles formed by the addition of a blowing agent added to the outer layer of the multi-layer film provided to the circular die. The film blowing agent causes the gas bubbles to be created in the outer layer as the outer layer is co-extruded in the circular die. In a further embodiment, the outer layer may include an UV stabilizer, an UV absorber and an antioxidant. The outer layer may also include a polyolefin elastomer based material and/or a grit material which adheres to the outside of the gas bubbles formed by the blowing agent, for providing additional slip resistance to the film.

The middle layer may include a polyolefin material as well as one or more of the following: an UV stabilizer, an UV absorber and an antioxidant.

In a further embodiment, the method may include, prior to the step of applying the pressure sensitive adhesive to the inner layer, treating or coating the inner layer to enhance the adhesion of the pressure sensitive adhesive to the inner layer. For example, the inner layer may be treated with a corona discharge treatment.

In yet another embodiment, at least one of the two rollers is a rubber roller.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

The present invention features a one-sided slip resistant material made by the well known blown film process, which process is well known in the industry, comprising the co-extrusion of multiple layers to produce a finished film composite having the desired characteristics described herein.

Figure 1:
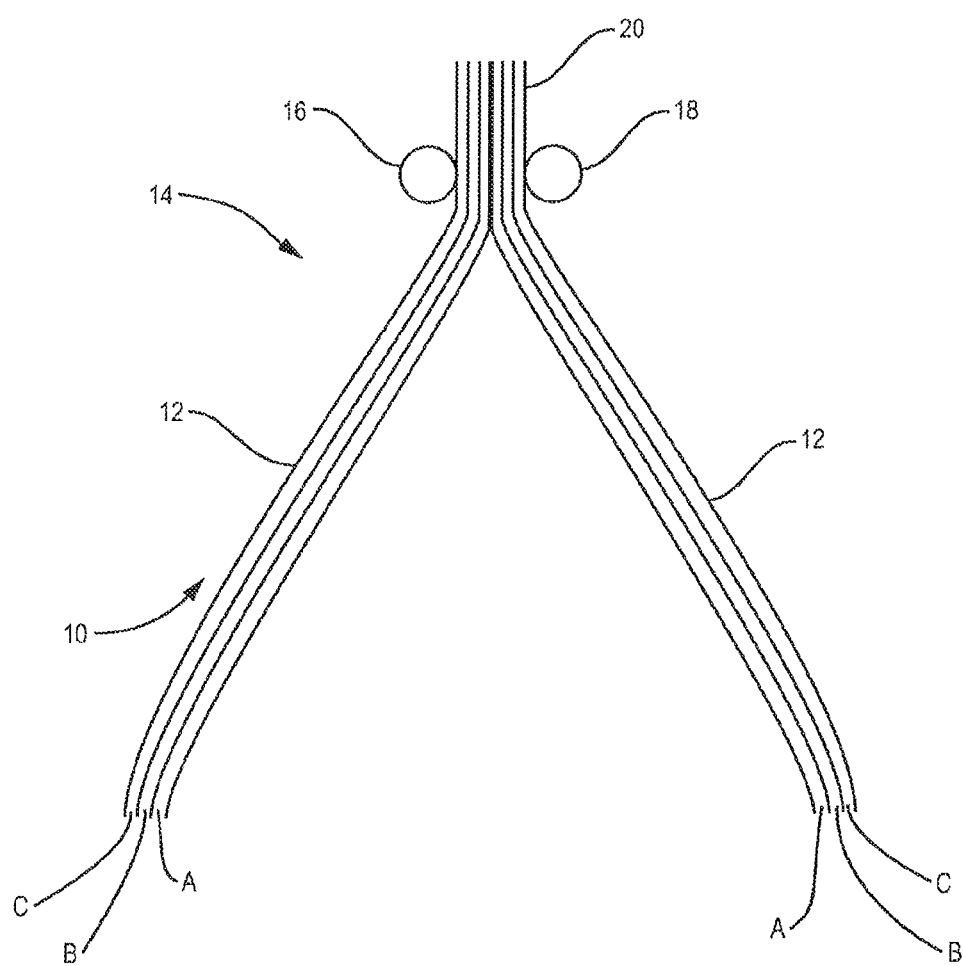
FIG. 1 is a perspective schematic view of a portion of a system for making the slip resistant material according to the present invention.

As illustrated in FIG. 1, a film blowing machine (not shown but well known in the art) produces a circular or cylindrical film "bubble" 10 comprising, in the preferred embodiment and without limiting the present invention, 3 layers or films: A, B and C. In the preferred embodiment, layer A, (the inside most layer of the bubble) is an adhesive coatable thermoplastic layer of approximately 0.2 to 2 mils in thickness having a softening point in the range of 200° to 300° F. which facilitates or accepts a coating of a pressure sensitive adhesive (PSA), as will be described below. Layer A may be an LDPE, LLDPE, HDPE, PP, EVA, EMA POP (polyolefin plastomer) or POE (polyolefin elastomer) resin based layer or a blend of several such resins or other suitable resin(s). In addition to the resin, this layer may also include a UV stabilizer, UV absorber, antioxidant, and processing or thermal stabilizer.

Layer B, the central or center layer, is preferably a flexible polyolefin layer having a thickness of approximately 0.5-2 mils. Suitable materials for the center B layer include, but are not limited to, LDPE, LLDPE, TPO, POP (Polyolefin Plastomer) and POE (Polyolefin Elastomer). In addition to the resin this layer may also include a UV stabilizer, UV absorber and antioxidant which will be exposed during the manufacturing process after the formation of the collapsed bubbles in the C layer.

The C layer (the outermost layer of the film which will form the top of the finished film product) is also a flexible polyolefin layer. This layer, however, contains a "blowing" agent that causes the film to form many small "bubbles" on the exterior surface 12 of the C layer. The blowing agent creates a gas in the extruder during the melting process and this gas is distributed throughout the C layer and is soluble in the molten plastic due to the high extruder pressure. When the film exits the blown film die, there is a drop in pressure, and bubbles form in the C layer. By stretching and cooling the film, the bubbles collapse forming a rough, nonslip, open celled "textured" surface 12.

The blowing agent can be either a physical blowing agent (PBA) such as carbon dioxide or butane, or an exothermic or endothermic chemical blowing agent (CBA) such as a sodium bicarbonate and citric acid mixture which decomposes under heat during the extrusion process and produces a gas.

In the preferred embodiment, the preferred flexible polyolefin of the C layer is a polyolefin elastomer (POE) such as Dow Chemical's Versify™ product and preferably, Versify™ 2300. After considerable experimentation, it has been determined that not all polyolefin elastomers are suitable for the skid resistance (non-slip) application. A resin with appropriate melting point and softness to create bubbles that are very rubbery, flexible and high Coefficient of Friction (COF) creating a surface with significant "slip" resistance is required. These characteristics, which can be found in the Versify™ 2300 product include: flexural modulus less than 200 MPa, and Durometer hardness (Shore A) less than 100.

In addition to the polyolefin elastomer, layer C may also include, a UV stabilizer, UV absorber and/or antioxidant, as well as potentially a grit material such as ultra-high molecular weight polyolefin which will adhere to the outside of the bubbles formed by the blowing agent and add additional slip resistance to the surface of the finished film. The blown film before the blowing agent is activated is preferably 2.5 to 4 mils thick. After activating the blowing agent, the film "puffs" out and will have a thickness of approximately between 6 and 12 mils.

Near the top of the bubble 14, two rollers 16, 18 (top nip rollers) are utilized to "collapse" the top of the bubble 14 causing both inside A layers of the bubble 10 to come together and abut one another but not to fuse or stick together. In the preferred embodiment, one of the rollers is a rubber roller while the other may be a rubber roller or a metal nip roller although the nip rollers 16, 18 may be individually or both made from either rubber, metal, plastic or any other suitable material.

Figure 2:
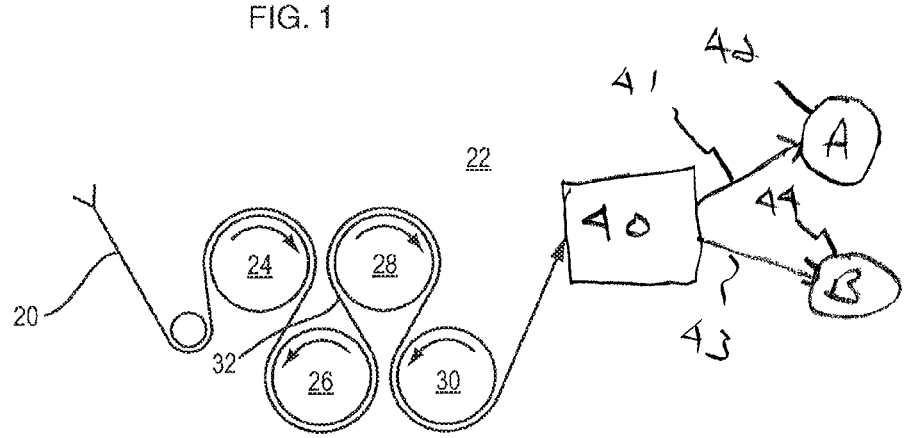
FIG. 2 is a schematic diagram of the travel path of the single-sided, transparent, slip resistant material of the present invention after the material has been blown showing incorporation of a machine direction orienter (MDO) in-line in the manufacturing process.

The processing of the film layer 20 according to one embodiment is shown schematically in FIG. 2. In this embodiment, after the film 20 leaves the rollers 16/18, the film enters a set of in-line rollers 24-30 which serve as a Machine Direction Orienter (MDO) generally shown as 22. The rollers 24-30 of the MDO 22 serve as a post treatment of the film, annealing or conditioning the film to take any stresses out of the film and to remove any variation in thickness. The MDO section preferably includes 2 pairs of 2 rollers each. The first two rollers 24/26 are heated to a temperature above the glass transition temperature and below the softening point of the resin of the inside A layer of the film 20 (in order to prevent the two A layers from sticking to each other). These rollers operate at a speed which is the same as the speed at which the blown film 20 is manufactured.

The next two rollers 28/30 are cooling rollers operated at a temperature in the range of 80-100° F. In addition, the cooling rollers 28/30 are operated at a speed of 2% to 10% faster than the line or manufacturing speed at which the first two rollers 24/26 operate. The pair of cooling rollers 28/30 serve to cool the film down before it is wound into a roll for later use. Although the use of an MDO is known in the art, it is not known to place such a device "in line" in the manufacturing process. Typically, in the prior art, a film is blown, wound onto a roll, subsequently unwound into an MDO for stretching, and then rewound before use.

The set of in-line rollers 24-30, which serve as a Machine Direction Orienter (MDO) 22 are optional and provided in one embodiment while in another embodiment, the MDO 22 may be omitted completely and replaced by only such rollers as necessary to take up and process the film 20 as it comes off the film blowing machine.

The film 20, which has now gone through the MDO (if provided), is next fed to an edge slitter 40, which is well known in the art. The edge slitter 40 slits or cuts the two edges of the film separating it into two independent and identical films 41 and 43 each being transparent, with slip resistant layer C on one side. The two films 41 and 43 are then fed to a roller or winder which winds the films into rolls of desired size/length 42, 44. These rolls are then provided to a coating system for applying a pressure sensitive adhesive, as described below. Alternatively, the two films 41, 43 may be coated in-line after exiting the edge slitter 40 and before being wound.

The one-sided anti slip film is coated with a self-adhering removable pressure sensitive adhesive (PSA). The PSA can be a rubber based or more preferably, acrylic based and is designed to adhere to the top surface of an object such as a boat deck, typically a gel coat surface based on epoxy or polyester resin. The PSA is formulated to provide good self adhering properties, but is also removable and will not leave a residue on the boat or other surface. Typically the A layer of the antiskid film is surface treated with a corona discharge treater (CDT) or other treatment to increase the surface energy of the film and provide good adhesion of the PSA to the film. The PSA can be a water-based, solvent-based, or a hot melt and can be coated using typical coating methods such as knife over roll, reverse roll, gravure or other roll coating methods.

Accordingly, the present invention provides a single-sided, self-adhesive, transparent, non-slip, waterproof, UV resistant, non-yellowing film which is easy and relatively inexpensive to manufacture and which is slip resistant on one side, and can be used for numerous applications such as painter's drop cloths, non-slip protective coverings, moving cloths and the like.

Modifications and substitutions by one of ordinary skill in the art are considered to be within the scope of the present

What is claimed is:

1. A method for making single-sided, anti-slip films each having an interior layer, a core layer of flexible polyolefin, and an exterior slip-resistant layer based on a polyolefin elastomer, the method comprising steps of:

using a film-blowing machine to coextrude from a circular die a multilayer film tube of at least three coextruded layers, wherein the coextruded film tube includes an inner layer corresponding to said interior layer, a middle layer corresponding to said core layer, and an outer layer corresponding to said exterior layer, wherein said outer layer comprises a blowing agent causing gas bubbles to form in the outer layer during said coextrusion, and wherein said tube has a first and second side each including said three layers;

drawing the coextruded multilayer film tube away from the circular die at a predetermined speed;

at a predetermined distance from the circular die, collapsing the coextruded multilayer film tube during said drawing by passing the film tube between at least two collapsing nip rollers positioned in close proximity to one another so that a first roller of said at least two nip rollers contacts said first side of the coextruded multilayer film tube and a second roller of said at least two nip rollers contacts said second side of the coextruded multilayer film tube, wherein first and second inner layer sides of the first and second film tube sides abut one another as a result of said collapsing without fusing or sticking together;

treating the collapsed film tube so as to collapse said plurality of gas bubbles and form a rough, slip-resistant, open-celled exterior surface on first and second outer layer sides of said first and second film tube sides; and cutting the treated film tube proximate first and second edges thereof so as to form two generally identical film layers as said single-sided, anti-slip films each comprising said interior, core, and exterior layers.

2. The method of claim 1, further comprising applying a pressure-sensitive adhesive to the interior layers of each generally identical anti-slip film.

3. The method of claim 2, further comprising pre-treating each interior layer of each generally identical anti-slip film prior to said applying of pressure-sensitive adhesive so as to enhance adhesion of the pressure-sensitive adhesive to each interior layer.

4. The method of claim 3, wherein said pre-treating is conducted by a corona discharge treater.

5. The method of claim 2, wherein the pressure-sensitive adhesive is acrylic-based.

6. The method of claim 1, wherein said treating comprises:

passing the collapsed film tube through a pair of heated in-line rollers, wherein at least one of said pair of heated in-line rollers is heated above the glass transition temperature and below the softening point of said inner layer so as not to cause fusing of the abutting first and second inner layer sides, said pair of heated in-line rollers rotating at approximately the same speed as the predetermined speed at which the coextruded multilayer film tube is drawn from the circular die; and subsequent to passing the collapsed film tube through said pair of heated in-line rollers, passing the collapsed film tube through a pair of cooled in-line rollers rotating faster than said pair of heated in-line rollers so as to stretch the heated film tube in at least one direction, wherein at least one of said pair of cooled in-line rollers is operated at a temperature cooler than the softening point of said inner layer, and wherein said plurality of gas bubbles are collapsed by said stretching and cooling.

7. The method of claim 1, wherein the outer layer comprises at least one of a UV stabilizer, a UV absorber, and an antioxidant.

8. The method of claim 1, wherein the middle layer comprises at least one of a UV stabilizer, a UV absorber, and an antioxidant.

9. The method of claim 1, wherein the outer layer comprises a grit material adhering to the outside of said gas bubbles, the grit material providing additional slip resistance to each generally identical anti-slip film.

10. The method of claim 1, wherein material of the outer layer has a flexural modulus of less than 200 MPa and a Shore A Durometer hardness of less than 100.

11. The method of claim 1, wherein said coextrusion is a vertical coextrusion and wherein said drawing draws the film tube upwardly from the circular die.

12. The method of claim 1, wherein the first nip roller is a rubber roller and the second nip roller is a rubber or metal roller.

13. The method of claim 1, wherein at least one of the nip rollers is heated above a glass transition temperature and below a softening point of said inner layer so as not to cause fusing or sticking of the abutting first and second inner layer sides.

* * * * *